US012617706B2

(12) United States Patent
Momo et al.

(10) Patent No.: US 12,617,706 B2
(45) Date of Patent: May 5, 2026

(54) METHOD FOR PRODUCING GLASS ARTICLE AND GLASS-MELTING FURNACE

(71) Applicant: NIPPON ELECTRIC GLASS CO., LTD., Shiga (JP)

(72) Inventors: Daisuke Momo, Shiga (JP); Tomohiro Sato, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 256 days.

(21) Appl. No.: 18/681,606

(22) PCT Filed: Jun. 16, 2022

(86) PCT No.: PCT/JP2022/024135
§ 371 (c)(1),
(2) Date: Feb. 6, 2024

(87) PCT Pub. No.: WO2023/021830
PCT Pub. Date: Feb. 23, 2023

(65) Prior Publication Data
US 2024/0343628 A1      Oct. 17, 2024

(30) Foreign Application Priority Data

Aug. 16, 2021    (JP) ................................. 2021-132244

(51) Int. Cl.
*C03B 5/24*         (2006.01)
*C03B 5/03*         (2006.01)
(52) U.S. Cl.
CPC . *C03B 5/24* (2013.01); *C03B 5/03* (2013.01)
(58) Field of Classification Search
CPC .... C03B 5/027–031; C03B 5/24; C03B 5/425
See application file for complete search history.

(56) References Cited

U.S. PATENT DOCUMENTS 2,866,838 A * 12/1958 Paxton ...................... C03B 5/24
                                                        65/29.21
3,530,221 A * 9/1970 Penberthy ............... C03B 5/027
                                                        373/40
(Continued)

FOREIGN PATENT DOCUMENTS

DE      20121350 U1 * 9/2002 ............... H05B 3/03
JP      5-87500          11/1993
(Continued)

OTHER PUBLICATIONS

JP-2021031355-A (Matsuyama) Mar. 1, 2021 (English language translation). [online] [retrieved Dec. 15, 2025]. Retrieved from: Espacenet. (Year: 2021).*

(Continued)

*Primary Examiner* — Erin Snelting
(74) *Attorney, Agent, or Firm* — Wenderoth, Lind & Ponack, L.L.P.

(57)                   ABSTRACT

Provided is a method of producing a glass article, including: a melting step of heating molten glass (Gm) in a glass melting furnace (2) through application of a current with electrode groups (13) to (16) including a plurality of electrodes (A) to (H) connected to a common power supply system; and a forming step of forming a glass fiber (Gf) from the molten glass (Gm) heated in the melting step. The melting step includes: a measurement step of measuring ground voltages of the electrodes (A) to (H) included in the electrode groups (13) to (16); and a determination step of determining leakage glass (Gx) from the glass melting furnace (2) based on variations in the ground voltages measured in the measurement step.

4 Claims, 5 Drawing Sheets

(56) References Cited

U.S. PATENT DOCUMENTS

| | | | | |
|---|---|---|---|---|
| 4,224,459 A | * | 9/1980 | Froberg ................. | C03B 5/027 |
| | | | | 373/41 |
| 4,323,383 A | * | 4/1982 | Sims ................... | H05B 3/0023 |
| | | | | 373/40 |
| 4,819,248 A | * | 4/1989 | Varrasso ............. | H05B 3/0023 |
| | | | | 373/39 |
| 5,562,363 A | | 10/1996 | Wetmore et al. | |
| 2007/0098036 A1 | | 5/2007 | Duch et al. | |

FOREIGN PATENT DOCUMENTS

| | | | | | | |
|---|---|---|---|---|---|---|
| JP | H07128112 | A | * | 5/1995 | | |
| JP | 2007-507409 | | | 3/2007 | | |
| JP | 2009155113 | A | * | 7/2009 | .............. | C03B 5/16 |
| JP | 2012162422 | A | * | 8/2012 | | |
| JP | 2016-141605 | | | 8/2016 | | |
| JP | 2018-193268 | | | 12/2018 | | |
| JP | 2021031355 | A | * | 3/2021 | .............. | C03B 5/16 |

OTHER PUBLICATIONS

JP-2009155113-A (Ikeda) Jul. 16, 2009 (English language translation). [online] [retrieved Mar. 5, 2026]. Retrieved from: Clarivate Analytics. (Year: 2009).*
JP-H07128112-A (Yoshioka) May 19, 1995 (English language translation). [online] [retrieved Mar. 5, 2026]. Retrieved from: Clarivate Analytics. (Year: 1995).*
JP-2012162422-A (Minazu) Aug. 30, 2012 (English language translation). [online] [retrieved Mar. 5, 2026]. Retrieved from: Clarivate Analytics. (Year: 2012).*
DE-20121350-U1 (Schott Glas) Sep. 19, 2002 (English language translation). [online] [retrieved Mar. 5, 2026]. Retrieved from: Clarivate Analytics. (Year: 2002).*
International Search Report (ISR) issued Aug. 23, 2022 in International (PCT) Application No. PCT/JP2022/024135.
International Preliminary Report on Patentability and Written Opinion of the International Searching Authority issued Feb. 13, 2024 in International (PCT) Application No. PCT/JP2022/024135.

* cited by examiner

METHOD FOR PRODUCING GLASS ARTICLE AND GLASS-MELTING FURNACE

TECHNICAL FIELD

The present invention relates to a method of producing a glass article and a glass melting furnace.

BACKGROUND ART

A method of producing a glass article, such as a glass fiber or a glass sheet, includes a melting step of melting a glass raw material to provide molten glass. In the melting step, a glass melting furnace including a plurality of electrodes each extending from a bottom wall portion of the furnace may be utilized. In the glass melting furnace of this kind, the glass raw material is melted in the furnace by supplying electric power to the electrodes to perform heating through application of a current, to thereby provide the molten glass. As compared to heating with a burner using a LPG or a heavy oil as a fuel, such heating through application of a current does not generate an exhaust gas of fuel origin, and can also suppress scattering of the glass raw material. In addition, the heating through application of a current also has advantages of, for example, being excellent in terms of environmental protection, being easily performed at high temperature, and facilitating uniform heating.

Meanwhile, in the glass melting furnace, a refractory is broken for some reason and the molten glass leaks out therefrom, which causes a serious trouble. Accordingly, when such leakage of the molten glass occurs, it is significantly important to promptly detect the leakage. In view of the foregoing, for example, in Patent Literature 1, there is a disclosure that a temperature measurement unit is arranged between an electrode and a bottom wall portion (through hole) of a glass melting furnace by which the electrode is held, and it is determined that leakage of molten glass occurs when a temperature measured with the temperature measurement unit is abruptly increased.

CITATION LIST

Patent Literature 1: JP 2018-193268 A

SUMMARY OF INVENTION

Technical Problem

In a glass melting furnace, the position at which leakage of molten glass occurs is not limited to an electrode arrangement position. That is, even at a position other than the electrode arrangement position, a refractory is broken due to, for example, aging degradation, and the molten glass may leak out therefrom. However, the invention according to Patent Literature 1 has a problem in that when the leakage of the molten glass occurs at a position other than the electrode arrangement position, the leakage cannot be detected.

An object of the present invention is to reliably detect occurrence of leakage of molten glass in a glass melting furnace.

Solution to Problem (1) According to one embodiment of the present invention, which has been devised in order to achieve the above-mentioned object, there is provided a method of producing a glass article, comprising: a melting step of heating molten glass in a glass melting furnace through application of a current with an electrode group including a plurality of electrodes connected to a common power supply system; and a forming step of forming a glass article from the molten glass heated in the melting step, wherein the melting step comprises: a measurement step of measuring a ground voltage of at least one of the electrodes included in the electrode group; and a determination step of determining leakage of the molten glass from the glass melting furnace based on a variation in the ground voltage measured in the measurement step. Herein, the "determining leakage of the molten glass" in the present invention includes not only the case of determining only the presence or absence of the leakage of the molten glass, but also the case of determining an occurrence position of the leakage of the molten glass.

With such configuration, when leakage of the molten glass occurs in the glass melting furnace, the ground voltage of an electrode arranged around the occurrence position of the leakage tends to be reduced. Meanwhile, in the electrode group to which the electrode belongs, the ground voltage of any other electrode arranged at a position spaced apart from the occurrence position of the leakage of the molten glass tends to be increased. That is, when the leakage of the molten glass occurs in the glass melting furnace, as described above, characteristic variations occur in the ground voltages of the electrodes of the electrode group. Accordingly, when the ground voltage of the electrode is measured in the measurement step, the leakage of the molten glass can be reliably determined based on a variation in the ground voltage in the determination step.

(2) In the configuration of the above-mentioned item (1), it is preferred that a plurality of the electrode groups be arranged.

With such configuration, variations in the ground voltages of the electrodes included in the electrode groups can be elaborately measured. Accordingly, the presence or absence of the leakage of the molten glass can be elaborately determined. In addition, such configuration also has an advantage in that, when the occurrence position of the leakage is determined, determination accuracy of the occurrence position is improved.

(3) In the configuration of the above-mentioned item (1) or (2), it is preferred that the determination step comprise determining the leakage of the molten glass based on a reduction in the ground voltage.

As described above, when the leakage of the molten glass occurs, the ground voltage of the electrode around the occurrence position of the leakage of the molten glass is reduced. Accordingly, when the leakage of the molten glass is determined based on a reduction in the ground voltage, the leakage of the molten glass can be more reliably determined.

(4) In the configuration of the above-mentioned item (3), it is preferred that the determination step comprise determining that the leakage of the molten glass occurs around the electrode reduced in the ground voltage out of the electrodes of the electrode group.

As described above, when the leakage of the molten glass occurs, the ground voltage of the electrode around the occurrence position of the leakage of the molten glass is reduced. Accordingly, when it is determined that the leakage of the molten glass occurs around the electrode reduced in the ground voltage, determination accuracy of the occurrence position of the leakage of the molten glass is improved.

(5) According to one embodiment of the present invention, which has been devised in order to achieve the above-mentioned object, there is provided a glass melting furnace, which comprises an electrode group including a plurality of electrodes connected to a common power supply system, and is configured to heat molten glass in the furnace through application of a current with the electrode group, wherein the glass melting furnace further comprises: a measurement unit configured to measure a ground voltage of at least one of the electrodes; and a determination unit configured to determine leakage of the molten glass from the furnace based on a variation in the ground voltage of the at least one of the electrodes measured with the measurement unit.

With such configuration, the same actions and effects as those of the corresponding configuration that have already been described can be exhibited.

Advantageous Effects of Invention

According to the present invention, the occurrence of the leakage of the molten glass in the glass melting furnace can be reliably detected.

DESCRIPTION OF EMBODIMENTS

Now, embodiments of a method of producing a glass article according to the present invention are described with reference to the drawings. Overlapping description may be omitted by denoting corresponding constituent elements in the embodiments by the same reference symbols. When only part of configurations are described in the embodiments, configurations of other embodiments that have already been described may be adopted for other parts of the configurations. In addition, configurations may be combined in a combination explicit in the description of the embodiments, and not only that, part of configurations of a plurality of the embodiments may be combined in an even implicit combination as long as the combination has no particular disadvantage.

First Embodiment

Figure 1:
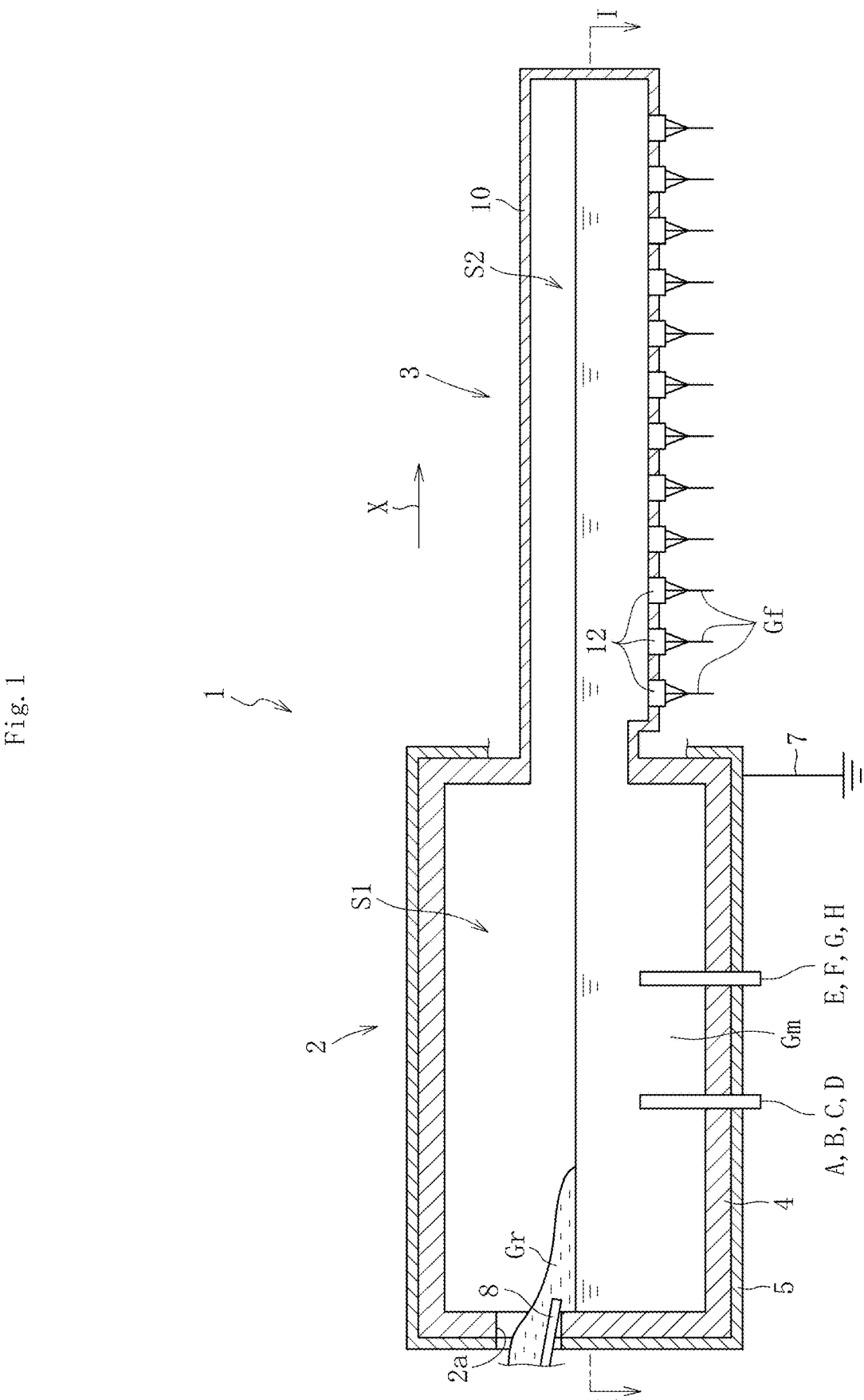
FIG. 1 is a longitudinal sectional view for illustrating a production apparatus for a glass article according to a first embodiment of the present invention.
Figure 2:
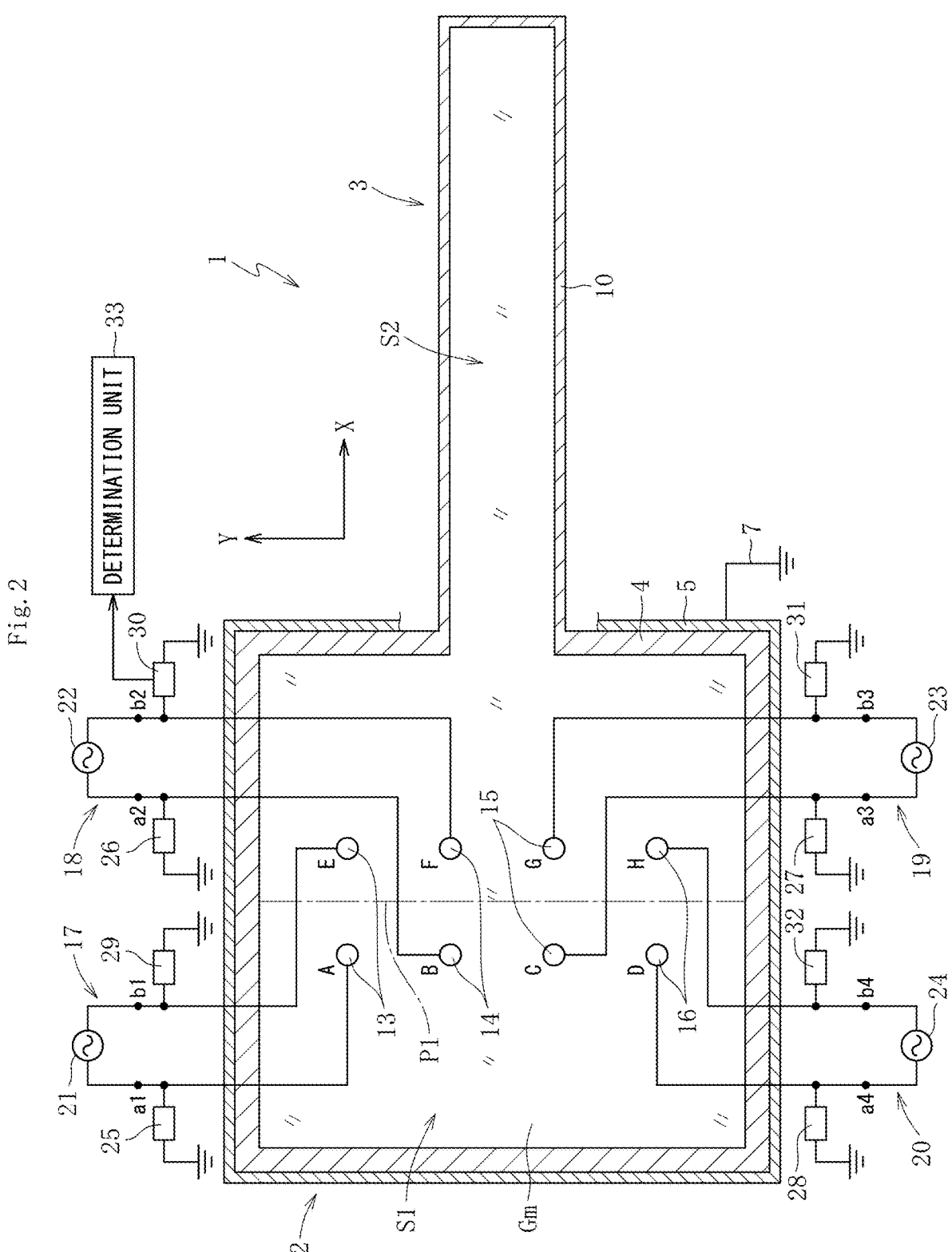
FIG. 2 is a sectional view taken along the line I-I of FIG. 1.

As illustrated in each of FIG. 1 and FIG. 2, a method of producing a glass article according to a first embodiment comprises producing a glass fiber Gf serving as a glass article by using a production apparatus 1 for a glass article. The production apparatus 1 for a glass article comprises: a glass melting furnace 2 that melts a glass raw material Gr to produce molten glass Gm; and a forehearth 3 that is connected to an end portion of the glass melting furnace 2 on a downstream side, and allows the molten glass Gm supplied from the glass melting furnace 2 to flow therethrough.

The glass melting furnace 2 comprises: a refractory 4 that defines and forms a melting space S1 for the molten glass Gm; and a casing 5 that covers the periphery of the refractory 4 on the outer side. The melting space S1 means an internal space of the glass melting furnace 2 in which the molten glass Gm is stored.

The refractory 4 is formed of, for example, refractory brick, such as zirconia-based electrocast brick, alumina-based electrocast brick, alumina-zirconia-based electrocast brick, AZS (Al—Zr—Si)-based electrocast brick, or dense sintered brick.

The casing 5 is formed of, for example, a metal (conductor) such as an iron material (e.g., stainless steel). In addition, in this embodiment, the casing 5 is grounded with an earth wire 7.

A feed port 2a for feeding the glass raw material Gr, which is obtained by mixing silica sand, limestone, soda ash, cullet, and the like, into the furnace is arranged in an end portion (side wall portion) of the glass melting furnace 2 on an upstream side. A raw material supply part 8 such as a screw feeder is arranged in the feed port 2a. The glass raw material Gr may contain cullet.

A plurality of electrodes A to H each immersed in the molten glass Gm are arranged as heaters in a bottom wall portion of the glass melting furnace 2. The electrodes A to H are each formed of, for example, rod-shaped molybdenum (Mo). Moreover, the glass raw material Gr fed from the feed port 2a is melted by heating the molten glass Gm through application of a current with the plurality of electrodes A to H. Thus, the molten glass Gm is continuously produced from the glass raw material Gr. The molten glass Gm flows from the end portion of the glass melting furnace 2 on the downstream side into the forehearth 3. The electrodes may each be arranged in the side wall portion of the glass melting furnace 2 at such a height position that the electrode is immersed in the molten glass Gm. In addition, the glass melting furnace 2 is not limited to an all-electric melting furnace using only heating through application of a current, and may be a furnace using gas combustion and heating through application of a current in combination.

Figure 3:
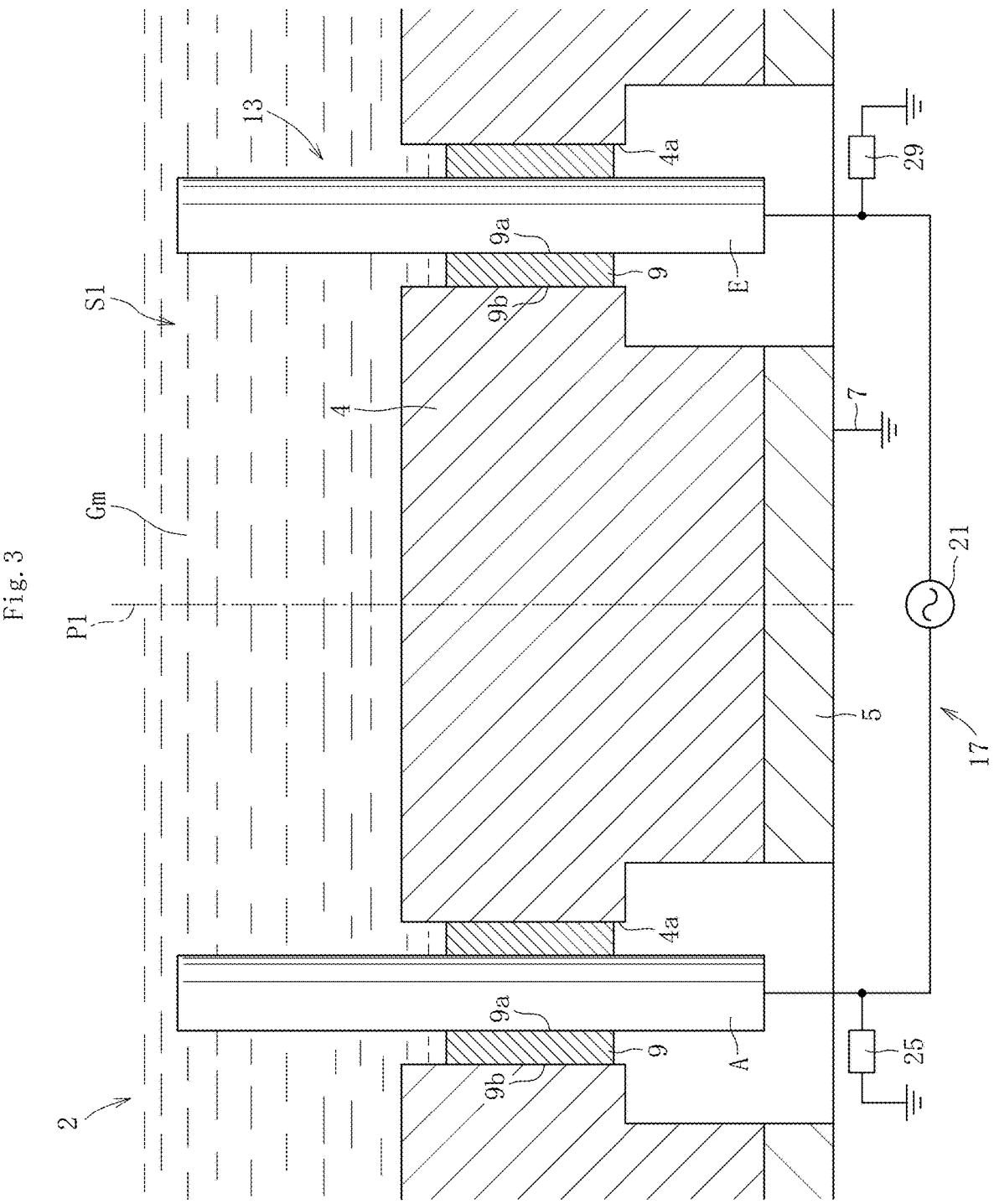
FIG. 3 is a longitudinal sectional view for illustrating a bottom wall portion of a glass melting furnace in the production apparatus of FIG. 1 in an enlarged manner.

In this embodiment, as illustrated in FIG. 3, the electrodes A to H are each arranged in the bottom wall portion of the glass melting furnace 2 under the state of being held by an electrode holder 9 that is formed of a metal such as an iron material (e.g., stainless steel) and has a tubular shape. Specifically, the outer peripheral surfaces of the electrodes A to H are each held by an inner peripheral surface 9a of the electrode holder 9 having a tubular shape, and an outer peripheral surface 9b of the electrode holder 9 is held by a through hole 4a formed in a bottom wall portion of the refractory 4. The electrode holder 9 comprises a cooler (not shown) for cooling each of the electrodes A to H so that wear of each of the electrodes A to H caused by heat is suppressed. The cooler is formed of, for example, a flow passage in which a refrigerant, such as water or air, is allowed to flow through an inside of the electrode holder 9. The electrodes A to H each penetrate through the bottom wall portion (the refractory 4 and the casing 5) of the glass melting furnace 2 under the state of being held by the electrode holder 9.

As illustrated in each of FIG. 1 and FIG. 2, the forehearth 3 comprises a refractory 10 that defines and forms a flow space S2 for the molten glass Gm. The flow space S2 means an internal space of the forehearth 3 in which the molten glass Gm is stored. In addition, although illustration is omitted, the forehearth 3 may also comprise a casing as with the glass melting furnace 2.

A plurality of bushings 12 each formed of platinum or a platinum alloy are arranged in a bottom wall portion of the forehearth 3 at a distance from each other in a flow direction X of the molten glass Gm. A plurality of nozzles (not shown) are arranged in each of the bushings 12. The nozzles each allow the molten glass Gm to flow down therefrom to form the glass fiber Gf. While the molten glass Gm having flowed down from the nozzles is down-drawn downwardly, the molten glass Gm is formed into the glass fiber Gf having a predetermined diameter. After that, a sizing agent is applied to the glass fiber Gf, and thus a plurality of the glass fibers Gf are bundled to become a glass fiber bundle. The forehearth 3 may be heated with a burner.

As illustrated in FIG. 2, the glass melting furnace 2 comprises a plurality of electric circuits 17 to 20 that supply electric power to a plurality of electrode groups 13 to 16, respectively, in which two electrodes out of the plurality of electrodes A to H each extending from the bottom wall portion of the furnace form one group. The electric circuits 17 to 20 form power supply systems electrically independent of one another.

In this embodiment, a total of eight electrodes A to H are arranged under the state in which four electrodes are arranged at equal intervals in a width direction Y in the furnace and two electrodes are arranged at equal intervals in the flow direction X in the furnace. Moreover, the two electrodes A and E facing each other in the flow direction X form the first electrode group 13. The two electrodes B and F facing each other in the flow direction X form the second electrode group 14. The two electrodes C and G facing each other in the flow direction X form the third electrode group 15. The two electrodes D and H facing each other in the flow direction X form the fourth electrode group 16. The arrangement mode of the electrodes, such as the number of electrodes and the arrangement positions thereof, and/or the combination of the electrodes in each electrode group is not particularly limited, and may be appropriately changed in accordance with, for example, the size of the glass melting furnace 2.

The first electric circuit 17 comprising a first single-phase AC power source 21 is connected to terminals a1 and b1 coupled to the electrodes A and E of the first electrode group 13, respectively. The second electric circuit 18 comprising a second single-phase AC power source 22 is connected to terminals a2 and b2 coupled to the electrodes B and F of the second electrode group 14, respectively. The third electric circuit 19 comprising a third single-phase AC power source 23 is connected to terminals a3 and b3 coupled to the electrodes C and G of the third electrode group 15, respectively. The fourth electric circuit 20 comprising a fourth single-phase AC power source 24 is connected to terminals a4 and b4 coupled to the electrodes D and H of the fourth electrode group 16, respectively.

The glass melting furnace 2 comprises: a plurality of measurement units 25 to 32 that measure the ground voltages of the electrodes A to H, respectively; and a determination unit 33 that determines leakage of the molten glass Gm (hereinafter referred to as "leakage glass") based on variations in the ground voltages of the electrodes A to H measured with the measurement units 25 to 32, respectively.

In this embodiment, the eight electrodes A to H are arranged, and hence a total of eight measurement units 25 to 32 corresponding to the electrodes A to H are arranged. In FIG. 2, a state in which one measurement unit 30 is connected to the determination unit 33 is illustrated as an example, but in actuality, all the measurement units 25 to 32 are connected to the determination unit 33, and the ground voltages measured with the measurement units 25 to 32 are input to the determination unit 33. A method of connecting the determination unit 33 and each of the measurement units 25 to 32 to each other may be wired or wireless. For example, a personal computer or a mobile tablet may be utilized as the determination unit 33.

Herein, the molten glass Gm has electroconductivity in a molten state, and hence when the molten glass Gm is heated through application of a current with the electrodes A to H, a potential is generated throughout the molten glass Gm in the melting space. In addition, when an earth electrode is arranged in the melting space S1, the ground voltage of the molten glass Gm in the melting space S1 becomes 0 V at the position of the earth electrode. When the earth electrode is not arranged therein, the ground voltage of the molten glass Gm in the melting space S1 becomes 0 V at, for example, a center position P1, which is a structurally symmetric position, between the electrodes A to D and the electrodes E to H. In this embodiment, a case in which the earth electrode is not arranged in the melting space S1 is taken as an example.

Figure 4:
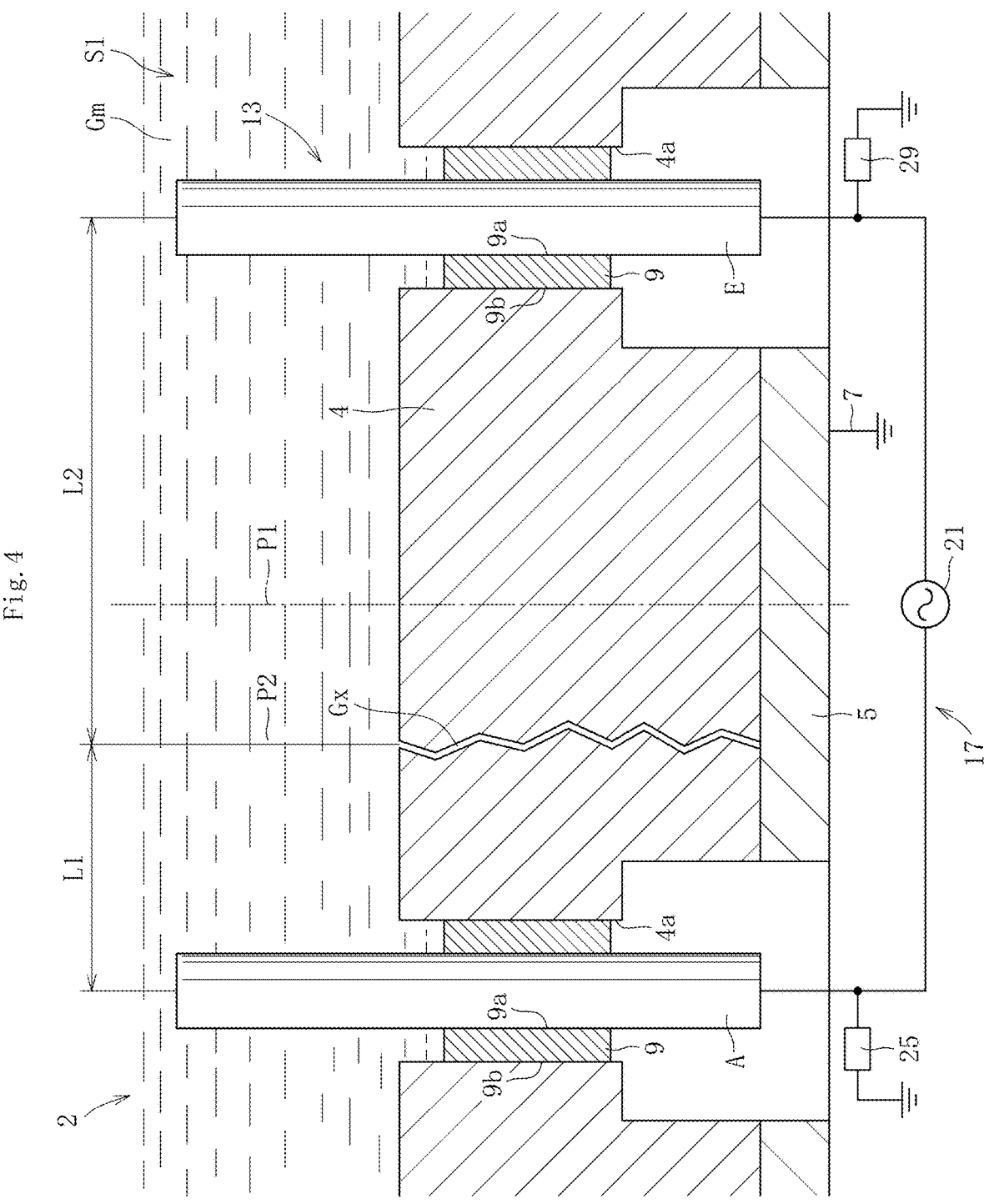
FIG. 4 is a longitudinal sectional view for illustrating the bottom wall portion of the glass melting furnace in the production apparatus of FIG. 1 in an enlarged manner.

Under that state, when leakage glass Gx occurs owing to, for example, a crack of the refractory 4 as illustrated in FIG. 4, the following phenomenon occurs. While the following description is made by taking, as an example, a case in which the leakage glass Gx occurs around the electrode A in the electrode group 13 comprising a pair of electrodes A and E, the same phenomenon may occur when the leakage glass Gx occurs around each of the other electrode groups 14 to 16.

The leakage glass Gx goes down along, for example, the crack of the refractory 4 to reach the casing 5. As a result, the molten glass Gm in the melting space S1 is conducted to the casing 5 via the leakage glass Gx having electroconductivity. Moreover, when such conduction is established, the position at which the ground voltage of the molten glass Gm in the melting space S1 becomes 0 V changes, for example, from the center position P1 to an occurrence position P2 of the leakage glass Gx because the casing 5 is grounded with the earth wire 7. Along with this, the ground voltages of the electrodes A and E of the electrode group 13 also change.

Specifically, the ground voltage of the electrode A arranged around the occurrence position P2 of the leakage glass Gx tends to be reduced. Meanwhile, the ground voltage of the electrode E arranged at a position spaced apart from the occurrence position P2 of the leakage glass Gx tends to be increased. More specifically, when the ground voltages of the electrodes A and E are each set to 50 V and the line voltages of the electrodes A and E (application voltage of the first single-phase AC power source 21) are each set to 100 V before the occurrence of the leakage glass Gx, for example, the ground voltage of the electrode A closer to the occurrence position P2 of the leakage glass Gx is reduced to 30 V and the ground voltage of the electrode E farther from the occurrence position P2 of the leakage glass Gx is increased to 70 V after the occurrence of the leakage glass Gx. In addition, although illustration is omitted, when the leakage glass Gx occurs at the arrangement position of the electrode A (e.g., the electrode holder 9), the ground voltage of the electrode A, at which the leakage glass Gx occurs, is reduced to 0 V, and the ground voltage of the electrode E farther from the occurrence position of the leakage glass Gx is increased to 100 V.

As described above, when the leakage glass Gx occurs, characteristic variations occur in the ground voltages of the electrodes A to H of the electrode groups 13 to 16. Accordingly, when the ground voltages of the electrodes A to H are measured with the measurement units 25 to 32, respectively, the leakage glass Gx can be determined in the determination unit 33 based on the variations in the ground voltages of the electrodes A to H having been measured.

The determination unit 33 preferably determines the leakage glass Gx based on reductions in the ground voltages of the electrodes A to H measured with the measurement units 25 to 32, respectively. That is, the determination unit 33 preferably determines that the leakage glass Gx occurs when a ground voltage measured with a measurement unit (e.g., the measurement unit 25) becomes equal to or lower than a predetermined first threshold value for at least one electrode (e.g., the electrode A) included in at least one electrode group (e.g., the electrode group 13). This is because, as described above, when the leakage glass Gx occurs, the ground voltage of an electrode (e.g., the electrode A) closer to the occurrence position P2 of the leakage glass Gx tends to be reduced. In this case, the determination unit 33 stores the first threshold value in a storage part such as a memory in advance. Considering that the electrodes A to H have different ground voltages (standard ground voltages) under the state in which the leakage glass Gx does not occur, different values may be set as the first threshold values for the electrodes A to H.

The determination unit 33 may determine the leakage glass Gx based on increases in the ground voltages of the electrodes A to H measured with the measurement units 25 to 32, respectively. That is, the determination unit 33 may determine that the leakage glass Gx occurs when a ground voltage measured with a measurement unit (e.g., the measurement unit 29) becomes equal to or more than a predetermined second threshold value for at least one electrode (e.g., the electrode E) included in at least one electrode group (e.g., the electrode group 13). This is because, as described above, when the leakage glass Gx occurs, the ground voltage of an electrode (e.g., the electrode E) arranged at a position spaced apart from the occurrence position P2 of the leakage glass Gx tends to be increased. In this case, the determination unit 33 stores the second threshold value in the storage part such as the memory in advance. Considering that the electrodes A to H have different ground voltages (standard ground voltages) under the state in which the leakage glass Gx does not occur, different values may be set as the second threshold values for the electrodes A to H.

In addition, the determination unit 33 may determine the leakage glass Gx based on increases and reductions in the ground voltages of the electrodes A to H measured with the measurement units 25 to 32, respectively. That is, the determination unit 33 may determine that the leakage glass Gx occurs when a ground voltage measured with a measurement unit (e.g., the measurement unit 25) becomes equal to or lower than a predetermined third threshold value for at least one electrode (e.g., the electrode A) included in at least one electrode group (e.g., the electrode group 13), and a ground voltage measured with a measurement unit (e.g., the measurement unit 29) becomes equal to or higher than a predetermined fourth threshold value for at least one other electrode (e.g., the electrode E, which forms a pair with the electrode A) included in the same electrode group (e.g., the electrode group 13). Thus, the determination can be made in consideration of both the tendency that the ground voltage of an electrode (e.g., the electrode A) closer to the occurrence position P2 of the leakage glass Gx is reduced and the tendency that the ground voltage of an electrode (e.g., the electrode E) farther from the occurrence position P2 of the leakage glass Gx is increased. As a result, the occurrence of the leakage glass Gx can be detected with higher accuracy. In this case, the determination unit 33 stores the third threshold value and the fourth threshold value in the storage part such as the memory in advance. Considering that the electrodes A to H have different ground voltages (standard ground voltages) under the state in which the leakage glass Gx does not occur, different values may be set as the third threshold values and fourth threshold values for the electrodes A to H.

Further, the determination unit 33 preferably determines that the leakage glass Gx occurs around the electrode (e.g., the electrode A) reduced in the ground voltage out of the electrodes of the electrode groups 13 to 16. Herein, the phrase "around the electrode reduced in the ground voltage" means that, as illustrated in FIG. 4, when a straight-line distance from the electrode A reduced in the ground voltage to the occurrence position P2 of the leakage glass Gx is defined as a first distance L1, and a straight-line distance from the electrode E increased in the ground voltage to the occurrence position P2 of the leakage glass Gx is defined as a second distance L2, the first distance L1 is shorter than the second distance L2. For example, when the ground voltages of the electrode A and the electrode E included in the electrode group 13 are reduced and increased, respectively, the ground voltages of the electrode B and the electrode F included in the electrode group 14 adjacent to the electrode group 13 are reduced and increased, respectively, and the ground voltages of the electrodes C, D, G, and H included in the other electrode groups 15 and 16 do not significantly change, it can be determined that the leakage glass Gx occurs around the electrode A and the electrode B. Further, when the ground voltage of the electrode A is reduced to a lower level than the ground voltage of the electrode B (that is, when a variation ratio is larger), it can be determined that the leakage glass Gx occurs at a position closer to the electrode A than the electrode B. That is, the two-dimensional coordinate (positions in the directions X and Y) of the occurrence position P2 of the leakage glass Gx can be determined based on the variation ratios of the ground voltages of the electrodes. Thus, the occurrence position P2 of the leakage glass Gx can be rapidly identified. Accordingly, such configuration is particularly advantageous when the melting space S1 of the glass melting furnace 2 is large (e.g., its dimension in the width direction Y is 5 m or more and its dimension in the flow direction X is 5 m or more).

Next, a method of producing a glass article by using the production apparatus 1 for a glass article having the above-mentioned configuration is described.

As illustrated in each of FIG. 1 to FIG. 4, the method of producing a glass article according to this embodiment comprises: a melting step of melting the glass raw material Gr in the glass melting furnace 2 to produce the molten glass Gm; a supply step of allowing the molten glass Gm to flow through an inside of the forehearth 3 to supply the molten glass Gm to the bushings 12 arranged in the bottom wall portion of the forehearth 3; and a forming step of allowing the molten glass Gm to flow down from the bushing nozzles (not shown) arranged in the bushings 12 to form the glass fiber Gf.

The melting step comprises: a measurement step of measuring the ground voltages of the electrodes A to H with the plurality of measurement units 25 to 32, respectively; and a determination step of determining the leakage glass Gx with the determination unit 33 based on variations in the ground voltages of the electrodes A to H measured with the measurement units 25 to 32, respectively. In addition, in this embodiment, the method of producing a glass article further comprises a repair step (not shown) of repairing the glass melting furnace 2 so that the leakage glass Gx is stopped when it is determined in the determination step that the leakage glass Gx occurs. From the viewpoint of smoothly starting the repair step, it is preferred that the occurrence position P2 of the leakage glass Gx be determined in the determination step.

In the determination step, for example, it is determined that the leakage glass Gx occurs when a ground voltage measured with a measurement unit (e.g., the measurement unit 25) becomes equal to or lower than the predetermined first threshold value for at least one electrode (e.g., the electrode A) included in at least one electrode group (e.g., the electrode group 13). A method of determining the leakage glass Gx is not limited thereto, and the other methods taken as examples in the description of the determination unit 33 may also be applied.

In the determination step, the occurrence position P2 of the leakage glass Gx may be determined in conjunction therewith. In this case, it is preferably determined that the leakage glass Gx occurs around the electrode (e.g., the electrode A) reduced in the ground voltage out of the electrodes of the electrode groups 13 to 16.

In the repair step, first, when it is determined in the determination step that the leakage glass Gx occurs, the supply of the molten glass Gm is partially or entirely stopped by, for example, stopping the raw material supply part 8. Thus, the storage amount of the molten glass Gm in the melting space S1 is reduced, and a pressure applied to an outflow portion of the leakage glass Gx is reduced. Next, the leakage glass Gx is cooled from an outside of the furnace by applying a cooling liquid (e.g., water) to the outflow portion of the leakage glass Gx at the occurrence position P2 of the leakage glass Gx. Thus, the leakage glass Gx is cooled and solidified, and thus the leakage is stopped. After that, a refractory is arranged at the occurrence position P2 of the leakage glass Gx so as to cover the outflow portion of the leakage glass Gx. After the refractory is arranged, the cooling at the occurrence position P2 of the leakage glass Gx may be stopped, but is preferably continued. In addition, the application of a current with the electrodes A to H may be stopped during the repair step, but in this case, there is a problem in that the temperature of the molten glass Gm is significantly reduced and its recovery takes time. Accordingly, even during the repair step, the application of a current is preferably continued with an electrode arranged in an area having no effect on the repair operation.

Second Embodiment

Figure 5:
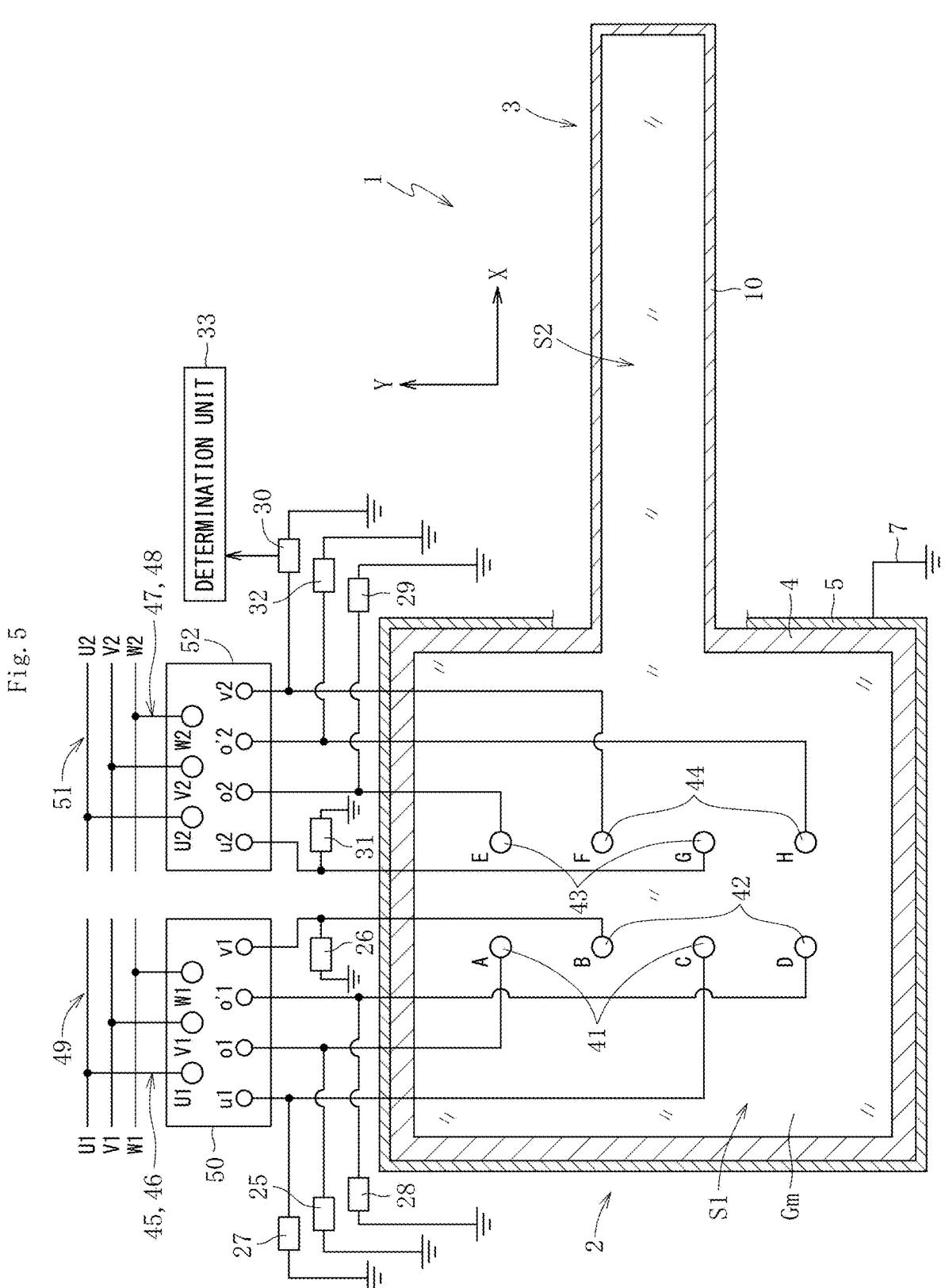
FIG. 5 is a transverse sectional view for illustrating a production apparatus for a glass article according to a second embodiment of the present invention.

As illustrated in FIG. 5, a production apparatus for a glass article and a method of producing a glass article according to a second embodiment differ from those of the first embodiment in the configurations of electrode groups 41 to 44 (combinations of electrodes) in the glass melting furnace 2 and the configurations of electric circuits 45 to 48 that supply electric power to the electrode groups 41 to 44, respectively. Also in this embodiment, the electric circuits 45 to 48 form power supply systems electrically independent of one another.

In this embodiment, in the same manner as in the first embodiment, a total of eight electrodes A to H are arranged under the state in which four electrodes are arranged at equal intervals in the width direction Y in the furnace and two electrodes are arranged at equal intervals in the flow direction X in the furnace. Moreover, unlike the first embodiment, the two electrodes A and C facing each other in the width direction Y form the first electrode group 41. The two electrodes D and B facing each other in the width direction Y form the second electrode group 42. The two electrodes E and G facing each other in the width direction Y form the third electrode group 43. The two electrodes H and F facing each other in the width direction Y form the fourth electrode group 44. The arrangement mode of the electrodes, such as the number of electrodes and the arrangement positions thereof, and/or the combination of the electrodes in each electrode group is not particularly limited, and may be appropriately changed in accordance with, for example, the size of the glass melting furnace 2.

The first electric circuit 45 comprising a first three-phase AC power source 49 is connected to terminals o1 and u1 coupled to the electrodes A and C of the first electrode group 41, respectively, via a first Scott connection transformer 50. Similarly, the second electric circuit 46 comprising the first three-phase AC power source 49 is connected to terminals o1' and v1 coupled to the electrodes D and B of the second electrode group 42, respectively, via the first Scott connection transformer 50. In addition, the third electric circuit 47 comprising a second three-phase AC power source 51 is connected to terminals o2 and u2 coupled to the electrodes E and G of the third electrode group 43, respectively, via a second Scott connection transformer 52. Similarly, the fourth electric circuit 48 comprising the second three-phase AC power source 51 is connected to terminals o2' and v2 coupled to the electrodes H and F of the fourth electrode group 44, respectively, via the second Scott connection transformer 52. Moreover, a three-phase AC is transformed into two single-phase ACs with each of the Scott connection transformers 50 and 52. That is, the three-phase AC is transformed into a total of four single-phase ACs with the two Scott connection transformers 50 and 52, and supplies electric power to each of the electrode groups 41 to 44 as a single-phase AC.

Also in the case where the three-phase AC is transformed into the single-phase ACs with each of the Scott connection transformers 50 and 52 as described above, when the leakage glass Gx occurs, the ground voltage of an electrode (e.g., the electrode A) closer to the occurrence position P2 of the leakage glass Gx is reduced. In addition, in the electrode group (e.g., the electrode group 41) to which the electrode reduced in the ground voltage belongs, the ground voltage of any other electrode (e.g., the electrode C, which forms a pair with the electrode A) is increased. Accordingly, in the same manner as in the first embodiment, when the ground voltages of the electrodes A to H are measured with the measurement units 25 to 32, respectively, the leakage glass Gx can be reliably determined in the determination unit 33 based on variations in the ground voltages of the electrodes A to H having been measured.

As a method of transforming the three-phase AC into the single-phase ACs, for example, a Woodbridge connection transformer, a modified Woodbridge connection transformer, or a roof-delta connection transformer may be utilized in place of the Scott connection transformer.

The present invention is not limited to the configurations of the above-mentioned embodiments. In addition, the action and effect of the present invention are not limited to those described above. The present invention may be modified in various forms within the range not departing from the spirit of the present invention.

In each of the above-mentioned embodiments, the case in which the glass melting furnace comprises the refractory and the casing in the stated order from an inside of the furnace has been described, but the present invention is not limited thereto. The casing may be omitted. However, when the casing is omitted, a variation occurs in the ground voltage of the electrode at the stage in which the leakage glass is brought into contact with another grounded object (e.g., a floor surface). Accordingly, from the viewpoint of detecting the leakage of the molten glass early, it is preferred to arrange a grounded casing.

In each of the above-mentioned embodiments, the case in which the ground voltages of all the electrodes included in one electrode group are measured has been described, but the present invention is not limited thereto. For example, when the ground voltage of one electrode included in one electrode group is measured, the leakage of the molten glass can be determined. That is, when the leakage of the molten glass occurs and the ground voltage of an electrode in the vicinity thereof is reduced, the ground voltage of any other electrode included in the electrode group including the electrode reduced in the ground voltage is increased. Accordingly, some variation occurs in the ground voltage of each of the electrodes, and hence it is only required to measure the ground voltage of at least one electrode included in one electrode group. However, in order to determine the occurrence position of the leakage glass with high accuracy, it is preferred to measure the ground voltages of a plurality of electrodes included in the electrode group, and it is more preferred to measure the ground voltages of all the electrodes included in the electrode group.

In each of the above-mentioned embodiments, the case in which one electrode group is formed of two (a pair of) electrodes has been described, but one electrode group may be formed of three or more electrodes. Specifically, for example, one electrode group may be formed by, for example, connecting a plurality of electrode pairs in parallel to one single-phase AC power source.

In each of the above-mentioned embodiments, the glass melting furnace is a single melter comprising only one melting space for the glass raw material, but may be a multi-melter having a plurality of melting spaces connected to each other.

In each of the above-mentioned embodiments, the case in which the glass article is a glass fiber has been described, but the glass article may be, for example, a glass sheet (including a glass roll formed by winding a glass film into a roll shape), an optical glass article, a glass tube, or a glass block.

REFERENCE SIGNS LIST 1 production apparatus for glass article
2 glass melting furnace
3 forehearth
4 refractory
5 casing
7 earth wire
8 raw material supply part
12 bushing
13-16 electrode group
17-20 electric circuit (power supply system)
21-24 single-phase AC power source
25-32 measurement unit
33 determination unit
41-44 electrode group
45-48 electric circuit (power supply system)
49, 51 three-phase AC power source
50, 52 Scott connection transformer
Gf glass fiber
Gm molten glass
Gr glass raw material
Gx leakage glass

The invention claimed is:

1. A method of producing a glass article, comprising:
a melting step of heating molten glass in a glass melting furnace through application of a current with an electrode group including a plurality of electrodes connected to a common power supply system; and
a forming step of forming a glass article from the molten glass heated in the melting step,
wherein the melting step comprises:
a measurement step of measuring a ground voltage of at least one of the electrodes included in the electrode group; and
a determination step of determining leakage of the molten glass from the glass melting furnace based on a variation in the ground voltage measured in the measurement step.

2. The method of producing a glass article according to claim 1, wherein a plurality of the electrode groups are arranged.

3. The method of producing a glass article according to claim 1, wherein the determination step comprises determining the leakage of the molten glass based on a reduction in the ground voltage.

4. The method of producing a glass article according to claim 3, wherein the determination step comprises determining that the leakage of the molten glass occurs around the electrode reduced in the ground voltage out of the electrodes of the electrode group.

* * * * *